United States Patent [15] 3,686,434

Lemelson [45] Aug. 22, 1972

[54] AREA SURVEILLANCE SYSTEM

[72] Inventor: Jerome H. Lemelson, 85 Rector St., Metuchen, N.J. 08840

[22] Filed: June 17, 1970

[21] Appl. No.: 47,023

Related U.S. Application Data

[63] Continuation-in-part of Ser. No. 225,173, Aug. 27, 1962, Continuation of Ser. No. 668,348, June 27, 1957, Pat. No. 3,051,777, which is a continuation-in-part of Ser. No. 267,377, March 11, 1963, which is a continuation-in-part of Ser. No. 781,689, Nov. 21, 1968, Pat. No. 3,539,715, which is a continuation of Ser. No. 347,999, Feb. 26, 1964, which is a continuation-in-part of Ser. No. 765,401, Oct. 6, 1958, abandoned.

[52] U.S. Cl. .....178/6.6 A, 178/6.6 DD, 178/DIG. 1, 178/DIG. 33, 178/DIG. 38

[51] Int. Cl. ............................H04n 5/78, H04n 7/18

[58] Field of Search ..........178/6.6 A, 6.6 DD, 6.8, 6, 178/DIG. 1, DIG. 33, DIG. 38

[56] References Cited

UNITED STATES PATENTS

| | | | |
|---|---|---|---|
| 3,049,588 | 8/1962 | Barnett | 178/DIG. 33 |
| 3,467,771 | 9/1969 | Polack | 178/DIG. 33 |
| 3,417,198 | 12/1968 | Loyd | 178/6.8 |

*Primary Examiner*—Howard W. Britton

[57] ABSTRACT

A system for continuously scanning an area for surveillance purposes with one or more television cameras by the controlled movement of the scanning means, and recording the resultant video signals for future analysis or monitoring. The scanning may be effected at video motion picture frequency or at a slow scan rate continuously or intermittently at predetermined time intervals. Provision is made for the automatic analysis of the scanning signals and the generation of alarm signals when unusual phenomena occur and change same.

In one form of system, a plurality of television cameras are each operative to scan a different image field which may include one or more phenomena such as a spacial volume such as a land or air area, warehouse, factory or store location, face of a cathode ray tube receiving signals generated by radar, sonar or other form of instrumentation. The outputs of these cameras or scanners are multiplexed and are sequentially recorded in a magnetic recorder such as one containing a multiple-channel magnetic tape. Each camera may be operated to complete a full frame sweep of its read-beam in sequence with the full frame sweeps of the other cameras.

The invention is also concerned with the automatic and remote control of an area scanner such as a television camera in accordance with the characteristics of signals generated by said camera and analyzed at a remote location.

9 Claims, 6 Drawing Figures

INVENTOR.
JEROME H. LEMELSON

INVENTOR.
JEROME H. LEMELSON

INVENTOR.
JEROME H. LEMELSON

AREA SURVEILLANCE SYSTEM

RELATED APPLICATIONS

This is a continuation-in-part of application Ser. No. 225,173 filed Aug. 27, 1962, for Video-Tape Recording, a continuation of application Ser. No. 668,348 filed June 27, 1957, for Magnetic Recording Systems, now U.S. Pat. No. 3,051,777, having as a parent application Ser. No. 515,417 filed June 14, 1955 now U.S. Pat. No. 3,003,109.

This is also a continuation-in-part of Ser. No. 267,377 filed Mar. 11, 1963 for Scanning Apparatus and Method having as a parent application Ser. No. 626,211 filed Dec. 4, 1956, for Automatic Measurement Apparatus, now U.S. Pat. No. 3,081,379. In addition this is a continuation-in-part of application Ser. No. 781,689 filed Nov. 21, 1968, now U.S. Pat. No. 3,539,715, which in turn was a continuation of application Ser. No. 347,999 filed Feb. 26, 1964, now abandoned, which in turn was a continuation-in-part of application Ser. No. 765,401 filed Oct. 6, 1958, now abandoned, entitled "Information Storage and Reproduction System."

This invention relates to automatic area surveillance systems operative for indicating and displaying predetermined variations in an area under surveillance so as to greatly enhance the ability of monitoring personnel to detect predetermined variations in the area being scanned. In particular, the invention is concerned with a surveillance system for detecting variations in radiation, such as radar signals, infra-red radiation generated by combustion and other means, existing in a particular community or other area of the earth desired to be monitored for detecting such phenomena as fires, intruders or the like.

Visual sighting means is often employed for security purposes to determine the existence of fires, the presence of intruders and other phenomenon throughout a particular area of location above the ground. For example, human beings are frequently employed in towers or platforms above the ground to visually scan by sighting areas of forest and other land to determine, by the sighting of smoke, the existence of fires. Fire detection within living communities is generally determined by an alarm system in which human beings who detect the fire locally will operate a fire alarm or report same by telephone. However, such visual sighting techniques suffer many shortcomings and frequently involve detection and reporting of a fire after it has burned out of control.

It is a primary object of this invention to provide a system for automatically detecting variations in radiation in a given area or community and for automatically indicating when predetermined variations in said radiation occur so as to warn the operators or attendants of the system of the detection of such variations.

It is a primary object of this invention to provide a new and improved system for detecting predetermined changes in the environments of a plurality of locations or substations situated remote from each other and from a monitor station.

Another object is to provide a system for automatically determining from a remote location when a predetermined change occurs in the environment of a detection unit and for indicating by means of a specific wireless signal associated with said unit, when said change occurs.

Still another object is to provide a system which consists of a monitor station and a plurality of sub-stations each of which has a detection transducer associated therewith and a code generating means energizable by said transducer to transmit a code therefrom adapted for receipt by said detection unit and indicative of when a specific change occurs in the environment of said unit as the result of the energization of a detection means thereat.

Another object is to provide a new and improved automatic system for monitoring a plurality of detection units or control devices located remote from each other and from a monitor station.

Another object is to provide a surveillance system for detecting variations in self-generated infra-red radiation or other variables associated with an area of the earth capable of varying either self-generated or system-generated radiation such as used in detecting smoke, air pollution, the existence of intruders or the like.

Another object is to provide an improved surveillance system having a plurality of monitor stations and intercommunicating means between said monitor stations for switching the output of an area scanning means operative to scan different fields within a selected scanning area so that either monitor station may be operated for monitoring the image derived in scanning different fields of the total area being scannned without interruption in the monitoring of information derived from a predetermined scanning procedure.

Another object is to provide automatic surveillance apparatus including a television camera and means for automatically varying the attitude of the camera during a scanning cycle so as to present different fields of surveillance in the scanning field of the camera and means for generating scanning signals derived while said camera is at predetermined different attitudes so as to provide information which is representative of the results of scanning said different fields by said camera.

Another object is to provide an automatic surveillance system which may be easily installed or set up to automatically scan selected environments and may be operated remotely by an operator and/or automatically.

Another object is to provide an automatic scanning and detection system which is capable not only of indicating when a change occurs in a given environment, such as the movement of an intruder or intrusion device into said camera, but also may analyze the resulting scanning signals and determine the characteristics of the change therefrom so as to permit the taking of suitable defensive or corrective action.

Another object is to provide a new and improved remote controlled automatic surveillance system employing shortwave communication means between a monitor station and a detection station.

Another object is to provide an apparatus for automatically and rapidly determining variations in an environment and for taking corrective action based on the results of automatic scanning.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
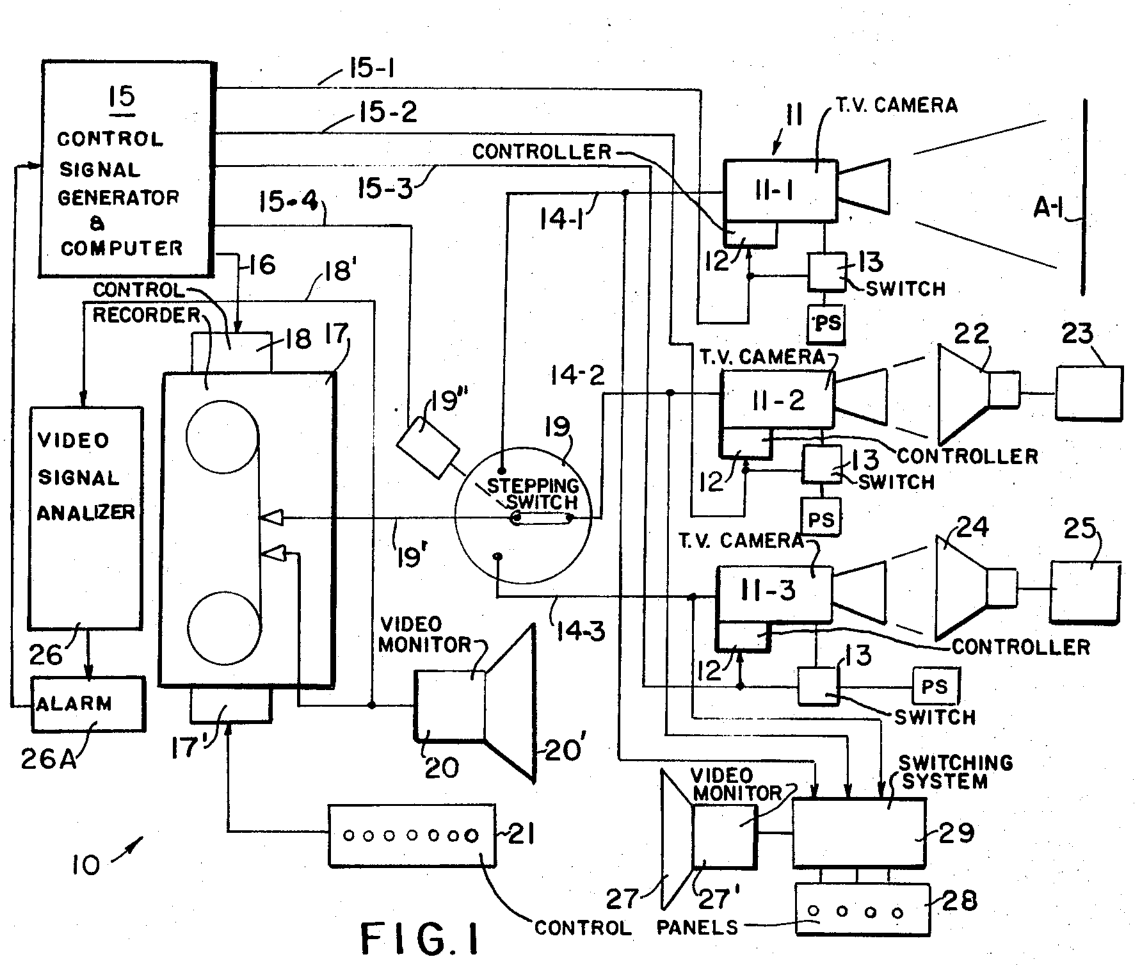
FIG. 1 is a schematic diagram illustrating components of an automatic surveillance system having a plurality of television scanning devices and a single recording unit for picture signals generated by said scanning devices, the system being controlled by a single master controller or computer.

In FIG. 1 is a shown a schematic diagram illustrating an automatic surveillance system 10 employing a plurality of surveillance scanning devices 11 such as respective television cameras referred to by the notations 11–1, 11–2 and 11–3, which are either disposed in fixed attitudes or movable to scan respective image areas. The notation A–1 in FIG. 1 refers to a scanning field for which the television camera 11–1 is operative to intermittently scan in response to the operation of a timer or signals generated by a computer located either at the camera or remote therefrom. The scanning field A–1 may comprise, for example, a floor area of a building, an area of landscape, an area immediately adjacent to and including a machine or portion of a machine operative to perform automatically on work fed thereto or moving therepast, or other phenomenon which may vary from time to time. Camera 11–2 is shown scanning the image screen of a cathode ray tube 22 which is operatively connected to receive the output of a radar search unit 23 which is automatically or remotely controlled to search a particular spatial volume above and/or adjacent the earth. Camera 11– 3 is located to scan the image screen of another cathode ray tube 24 which is operatively connected to the output of a scanning system 25 which may employ laser, radar, sonar, or other form of signal generating means operative to sense variations in a variable phenomenon such as manufacturing process, machine operation, intrusion detection system, variable process or other form of phenomenon to be scanned and remotely monitored or detected. The scanners 11 may comprise one or any number of conventional television cameras, flying spot scanners or other form of image-scanning means having outputs 14 which are either respectively connected to intermittently record their scanning signals onto respective channels of a multi-channel magnetic recorder 17 or to record said signals sequentially on a single channel of said recorder. The outputs 14–1, 14–2 and 14–3 of the cameras 11–1, 11–2 and 11–3 are, accordingly, illustrated as being connected to a multiplexing device 19, such as a rotary stepping switch having an output 19' connected to the recording input of the automatically operative magnetic recorder 17. Each camera is provided with a plurality of controls for properly controlling its operation in the act of intermittently scanning the image phenomenon presented to it. In a preferred mode of operation, each camera has a trigger controller 12 which is operative, when pulsed by a control signal, to cause the read beam of the camera to be deflection controlled and effect a single frame sweep of the image phenomenon presented to the camera so as to generate a single frame video picture signal on the output of the camera as defined, for example, in greater detail in application serial number 225,173 entitled Video-tape Recording Apparatus.

In the apparatus of FIG. 1, a timer or computer 15 has a plurality of outputs denoted 15–1, 15–2 and 15–3 which respectively extend to a plurality of control means for each of the cameras 11–1, 11–2 and 11–3. One of the control mean which is energized by a pulse generated on the respective output of the timer or computer 15 comprises said trigger controller 12 for the camera which, when pulsed, by a signal generated by the unit 15, causes the camera read beam to initiate and complete a single frame sweep of its image field. The other control 13 is a normally open switch operative to gate electrical energy from a power supply PS to the circuits of the associated camera for energizing same for a sufficient period of time to permit it to effect said single frame sweep of its image field. The switch 13 is, therefore, slow to open after being closed for a time interval necessary to effect said single frame sweep. If the camera circuits are all solid state or integrated circuits, they may be energized and de-energized in a substantially short time interval so that the camera need not be energized all the time but only in response to signals received by the switch 13. However, it is noted that the cameras may also be constantly energized by their power supplies and may be operative to continuously scan their image fields at a fixed frequency while the pulse generated by the timer or computer 15 may be operative to gate just one or a selected number of single frame video picture signals.

The multiplexing device or rotary stepping switch 19 is operative to receive signals on each of the outputs 14–1, 14–2 and 14–3 of the respective scanning cameras and to connect each of said outputs, in predetermined sequence, to the recording input 19' of the recorder 17 in accordance with signals generated on a further output 15–4 of the timer or computer 15, which signals are applied to the switching or stepping motor 19'' for the switch 19.

The timer or computer 15 also generates a signal on an output 16 which is passed directly to a singleframe controller 18 for the magnetic recorder 17 which operates, as defined in application serial number 225, 173 to position the recording member or tape thereof so as to record a single frame video picture signal on the next section of said tape beyond that section on which the previous single frame video picture signal was recorded by properly controlling movement and positioning of the tape. The control signal or pulse generated on the output 16 of unit 15 is thus appropriately timed to operate the recorder 17 to permit suitable and proper recording of the next single frame video picture signal therein.

Also shown connected to the output 19' of the switch 19 is an apparatus 26 for analyzing each video picture signal transmitted to the recorder 17 and for generating alarm or further control signals in response to predetermined variations in said video picture signals. The output of apparatus 26 may comprise a visual or audible alarm for the person monitoring the operations of the camera or one or more signals which are operative to control either scanning or other apparatus in accordance with the requirements of an operation of the automatic surveillance system 10. Operatively connected to receive signals reproduced from recorder 17 and/or transmitted to or generated by the signal analyzing apparatus 26 is a video monitor 20 having a viewing screen 20' on which is generated images such as still images of the image phenomenon scanned by the scanning devices or cameras 11. The recorded video picture signals may be selectively reproduced from the recorder 17 or derived directly from selected of the cameras 11–1, 11–2 and 11–3, may monitor such information and control the writing of information on the screen of monitor cathode ray tube 20 by means of a manual video which is also operative in accordance with the teachings of patent application serial number 225, 173.

Also shown in FIG. 1 is a second monitor cathode ray tube 27 and receiving circuits 27' for receiving and displaying information generated by any particular camera of scanner of the system. A control panel 28 is operative to connect monitor receiver 27' with the output of any selected camera of all those cameras utilizing the system in response to the manual operation of switching means of said control panel and/or signals generated by the analyzing and detection apparatus of computer 26. The video picture signal input to the monitor receiver 27' may be generated intermittently at a fixed frequency or in response to signals generated by the control panel 28 while the aforedescribed automatic operation of all of the cameras continues and the picture signals generated thereby are automatically recorded in recorder 17 for future monitoring or record-keeping purposes. Accordingly, the control console 28 includes means for operating a multiplexing or switching system 29 which includes all of the outputs of the cameras 11–1, 11–2 and 11–3 and the input to the receiver 27' for the cathode ray tube monitor 27. The manual console 28 may also include means for automatically controlling the manipulation of one or more cameras, the focus for the optical system of each camera and other apparatus associated with each scanning station as will be hereafter described. It is to be noted that all cameras may be fixedly or movably set up to scan respective spatial volumes or air space or respective cathode ray tubes or other devices which are variably operable in response to variations in events within the respective volumes of processes being scanned and monitored.

Figure 2:
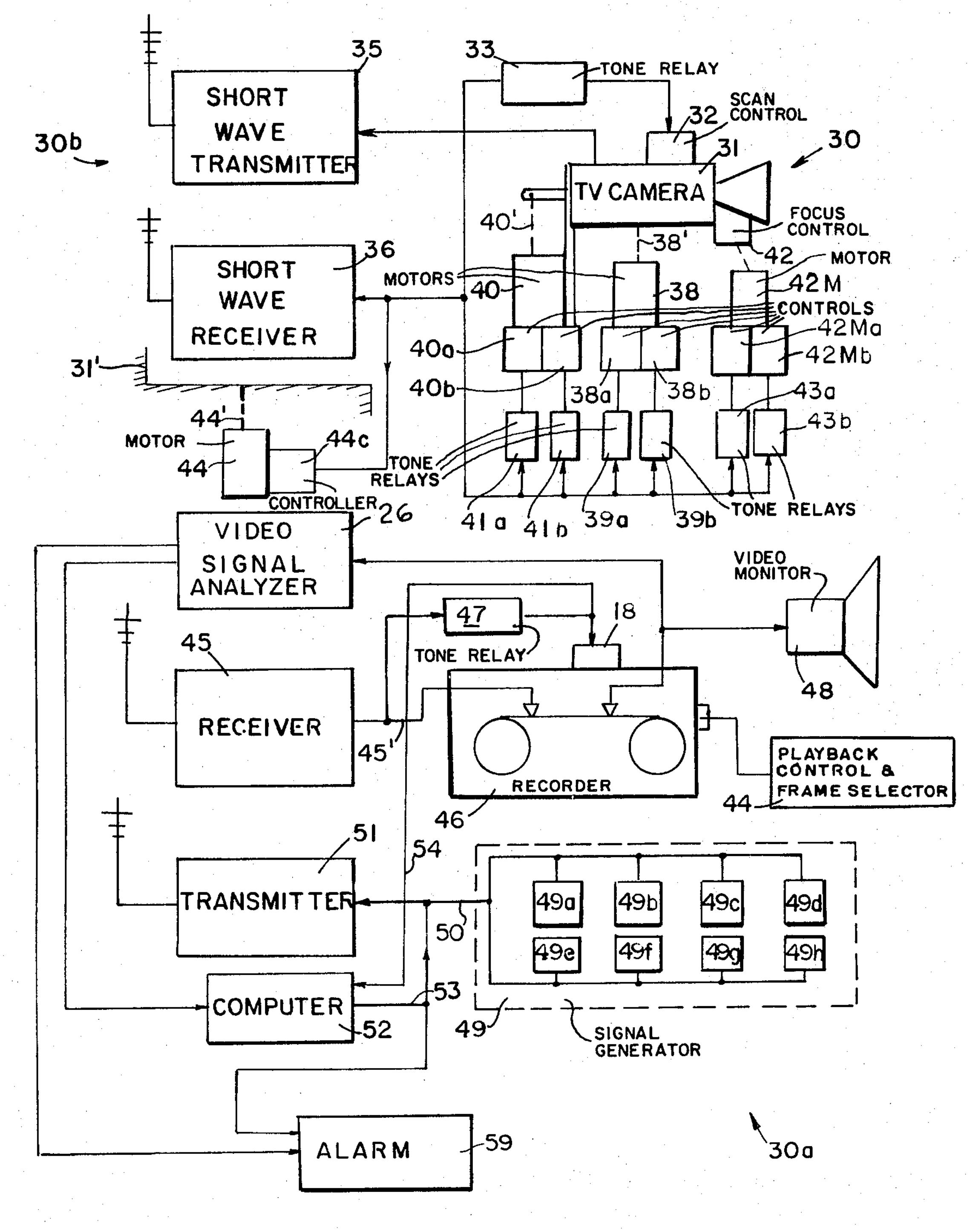
FIG. 2 is a schematic diagram showing means for controlling the movement of a television camera so as to change the area being surveyed by the scanning beam of the camera and a remote monitor station including both manual and computer controlled signal generating means for controlling the remotely situated camera.

In FIG. 2 is shown a modified form of the invention employing shortwave communication between a monitor station **30*a* and one or more scanning stations 30*b* as part of a surveillance system 30. Each scanning station 30*b* as part of a surveillance system 30. Each scanning station includes a television camera or flying spot scanner 31 which is either fixed in attitude or, in certain cases, is preferably movable about one or more axes to permit it to be remotely and/or automatically controlled to scan or sweep different portions of the spatial volume or image field surrounding said camera. In FIG. 2, the camera 31 is shown operatively connected to be rotated about a vertical axis by means of a first remotely controllable reversible motor 38 and to be rotated or pivoted about a horizontal axis as it rotates about its vertical axis by means of a second reversible motor 40. Suitable coupling means 38' and 40' connect the motors 38 and 40 to the housing or mount for the camera 31. For remote control, the motors 38 and 40 are preferably pulse operated stepping motors having at least two inputs each. For example, motor 38 has a first input 38*a* which, when pulsed, causes said motor to rotate the housing 31 in a first direction and a second input 38*b* which, when pulsed, causes the motor to rotate the housing in the opposite direction to said first direction. Similarly, motor 40 has inputs 40*a* and 40*b* which respectively rotate or pivot the housing about a horizontal axis up and down. Control means for the motor 38 include a first and second tone reponsive relays 39*a* and 39*b* which, when respectively energized by respective tone signals generated on their inputs from a receiver 36, generate pulses for controlling motor 38 to step the camera in respective directions about the vertical axis. Similarly, the input controls 40*a* and 40*b* for motor 40 are respectively connected to receive signals from tone responsive relays 41*a* and 41*b* having their inputs connected to the output of receiver 36. Accordingly, when particular tone signals are generated by the monitor station 30a and are transmitted to the receiver 36, they may be utilized to positionally control the camera 31** so as to predetermine its scanning axis for scanning different portions of the volume surrounding the camera throughout the realm of its attainable movement.

A further control 42 is provided to control the focus of camera 31 and is operated by reversible stepping motor 42M having its forward and reverse control inputs **42M*a* and 42Mb operatively connected to respective tone responsive relays 43*a* and 43*b* which receive respective tone signals generated by the monitor station 30*a* from receiver 36 and accordingly, vary the focus means 42 for the camera optical system. If infrared energy generating means or other means is utilized at the scanning stations 30*b* to illuminate or otherwise detect targets or changing phenomenon, it too may be remotely and/or automatically controlled by signals generated by the monitor station 30*a***.

Turning now to details of the monitor station **30*a*, a shortwave receiver 45 is provided which is tuned to receive the video signals generated by the scanning station and has its output 45' operatively connected to a recorder 46 of the type described. The monitor station includes an automatic controller 52 for generating suitable tone and pulse control signals on the input 50 to a shortwave transmitter 51 for transmission to one or more of the scanning stations 30*b* for automatically controlling the described apparatus thereof. Automatic controller 52 may comprise a multi-circuit timer or computer for generating the proper variable tone or code signals on a plurality of outputs including line 53** extending to shortwave transmitter 51 and a second output 54 extending to the single frame recording controller 18 for the video tape recorder 46. When 18 is pulsed, it operates as described above and in serial number 225, 173 to control the recorder 46 and position the magnetic tape thereof for recording the next single frame video picture signal received from the camera of the scanning station 30*b* or a elected similar scanning station of a plurality of such scanning stations as determined by tone and pulse signals generated by the automatic controller 52 or by an auxiliary signal generating means 49 which is manually operated by the person monitoring the apparatus. The signal generator 49 is composed of a plurality of push-button operated tone or code signal generators 49*a*–49*h* which are all connected to the input 50 to the shortwave transmitter 51 and which may be manually operated to generate respective tone signals which may be transmitted by shortwave to the receiver of a selected scanning station to effect control of the scanning of the camera thereof and/or its positional control as described. Each camera 31 is provided with a single frame scanning controller 32 equivalent in operation to the single frame controller 12 of FIG. 1 and defined in serial number 225, 173. The input to the trigger controller 32 is connected to a tone or code responsive relay 33 which is connected to the output of the receiver 35 of the scanning station while the picture signal output 34 of the camera thereof is connected to a shortwave transmitter 36 for transmitting said video signals to the receiver 45 of the monitor station either in response to signals received from the monitor station which operate the tone relay 33 and the trigger input 32 or in response to a timer or computer located at the scanning station.

Also shown in FIG. 2 is a manipulator in the form of a telescoping boom 44' for the camera apparatus which is operative to drive the camera on its mount 31' from a retracted or hidden position to a location above the ground such as above foliage, in response to signals generated at the monitor station 30*a* and transmitted to the shortwave receiver 36 of the scanning station 30*b*. A control 44*c* for a motor 44 which, when operating, causes the boom 44' to extend and retract, includes one or more coded relays which are operatively connected to the output of the shortwave receiver 36 so that when the proper control code signal is transmitted to the scanning station 30*b* from the sending station 30*a*, the motor 44 may be predeterminately controlled to control the location of the television camera 31 and its various attitude controls, in moving from a retracted to extended position and vice versa, depending on the control signals received by receiver 36.

Figure 3:
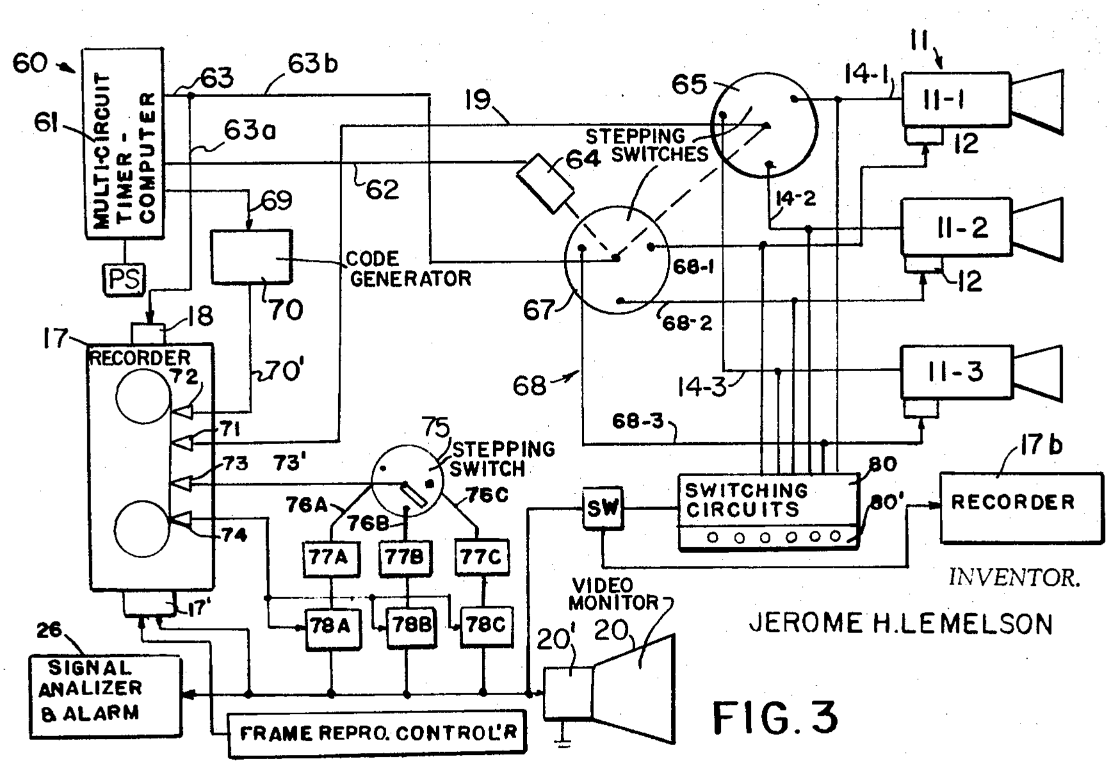
FIG. 3 is a schematic block diagram showing a modified form of the invention illustrated in FIG. 1.

In FIG. 3 is shown an automatic scanning and monitoring system 60 employing a plurality of scanners 11 such as television cameras denoted 11–1, 11–2 and 11–3 which are operative for scanning respective areas, spatial volumes or other phenomena as described at respective remote locations from the monitor station. The picture signal outputs 14–1, 14–2 and 14–3 of the cameras 11–1, 11–2 and 11–3 are connected to a multiplexing device 65 such as a rotary stepping switch operative to step in response to the operation of a solenoid 64 to gate said camera picture signal outputs to the input 19 of a video tape recorder 17 as described.

The scanning and recording of single-frame video picture signals is automatically effected by means of an automatic controller or computer 61 operative to generate respective control signals on a plurality of outputs 62, 63 and 69 thereof. Output 62 extends to the solenoid 64 for operating the rotary stepping switch 65. A second deck 67 of the stepping switch operatively connects an output 63 of the signal generator 61 to respective circuits 68–1, 63–2 and 68–3 extending to the single frame sweep controllers 12 of the cameras. The controllers are operative as described to cause, when pulsed by a signal generated on the output 63 and gated through the switch 67 to the respective inputs 68–1, 68–2 and 68–3 to respectively cause the read beam of the camera associated therewith to effect a complete sweep of the scanning field presented to the camera to generate a single frame video picture signal on the camera output. Accordingly, one camera may be operated to scan its field and generate a video picture signal which is gated to the recorder 17 and recorded along a first portion of it length after which the next camera is automatically controlled and operated to generate a single frame video picture signal of the image phenomenon in its field which is gated through the stepping switch to the recording input of the recorder 17 so as to effect a recording thereof on the next length of the video tape.

The output 63 of the signal generator 61 extends via one branch 63*b* through the switch deck 67 to that output 68 of said switch which is connected thereto by the operation of the switch while a second branch 63*a* of the output 63 connects to the described single-frame recording controller 18 for the recorder 17.

If the timer or computer 61 is operated to sequentially generate signals at a fixed frequency, a single-frame video picture signal from each camera will be recorded in sequence on the tape of the recorder 17 until all cameras have recorded respective single-frame picture signals after which the same cycle will be repeated. Accordingly, the scanning signals generated by any particular camera may be selectively reproduced by picking up each $n^{th}$ single-frame recording from the tape, an operation which may be performed either manually or by automatic means including a counter to count the number of single-frame recordings and gate only those associated with a particular selected camera.

A second mode of operation of the apparatus of FIG. 3 is provided by employing a code signal generator 70 which is energized at a particular time in each recording cycle by a signal generated on the output 69 of the multicircuit timer or computer 61. The code signal generator 70 generates a series code or tone on its output 70' which is passed through a code signal recording head 72 operative to record said code or tone signals on a recording channel of the magnetic recording tape of the recorder 17, there being at least a different code or tone signal generated and recorded to identify the associated picture signal recording for each camera.

To effect the reproduction of only those signals generated by a selected camera, the operator of the monitor station need merely selectively operate a rotary switch 75 which gates the output 73' of the code signal pick-up head 73 to a particular output of the switch 75 which switch outputs are denoted 76–1, 76–2 and 76–3. The outputs 76A, 76B and 76C are respectively connected to tone or code responsive relays 77A, 77B and 77C which, when energized by the particular tone or code signals pass through the switch 75 as reproduced from the code track of the tape of the recording unit 17, closes a respective gate, denoted 78A, 78B and 78C, at the proper instant and for the proper time interval to permit only the associated video picture signal to pass therethrough from the video signal reproduction head 74 of the recorder 17 to the input of the viewing cathode ray tube 20. Said cathode ray tube 20 may comprise a conventional television viewing tube or a storage tube operative to generate an image of the phenomenon defined by the single-frame video picture signal gated thereto as described. If the head 74 is operative to rotate to scan recording areas containing selected video picture signals diagonally across the tape of the recorder 17, the scanning rate may be such as to generate said single-frame video picture signals in a manner to repeatedly regenerate the picture information generated on the viewing screen of a conventional television receiver tube. Accordingly, the outputs of the respective tone or code responsive relays 77A,77B and 77C may be connected not only to close the slow-to-open switches 78–1, 78–2 and 78–3 but also to activate a single-frame reproduction controller 171 for the video tape recorder 17 which effects stoppage of the tape thereof so that the selected recording is in alignment with and repeatedly scanned by the reproduction head of said recorder for modulating the write beam of the cathode ray tube 20 at a fixed frequency to generate a still image of the information originally generated by one of the television cameras in the surveillance system. For details of the single-frame reproduction controller 17′ reference is made to application serial number 225, 173 which provides such details.

In the system 60, means may also be provided, as in FIG. 1, permitting the person monitoring the information received by the recorder 17 to view video information generated by a selective scanner or camera scanning a selected image field either as the result of viewing picture information generated on the screen of monitor 20 or as the result of an automatic alarm being generated in analyzing the video picture signals transmitted to the recorder 17. Accordingly, a control console 80 is provided in the apparatus of FIG. 3 which, when the push-buttons thereof are selectively operated, directly connects the input of the receiver 20′ for the monitor 20 with the output of a selected of the plurality of television cameras 11–1, 11–2 and 11–3 for immediately monitoring the information presented thereto. The control console 80 includes control means 80′ in the form of code or pulse generators operated by switches for generating signals on the connected lines or communication channels to a control means for a particular selected camera to control the operation of the camera as described and to automatically transmit its output, either as single-frame picture signals generated at slow scan or other frequency or as a motion picture television signal which is transmitted either by cable or shortwave to the receiver 20′ of the viewing cathode ray tube 20.

Figure 5:
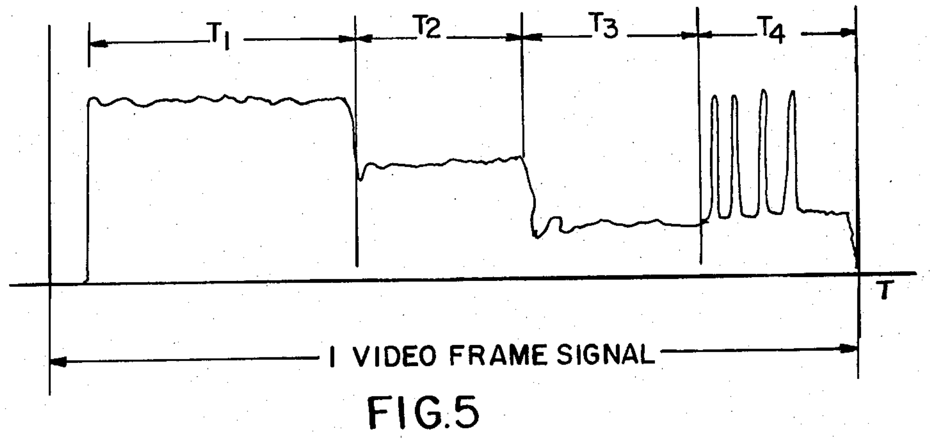
FIG. 5 is a graphical representation of a video picture signal capable of being analyzed by apparatus of the type shown in FIG. 4
Figure 4:
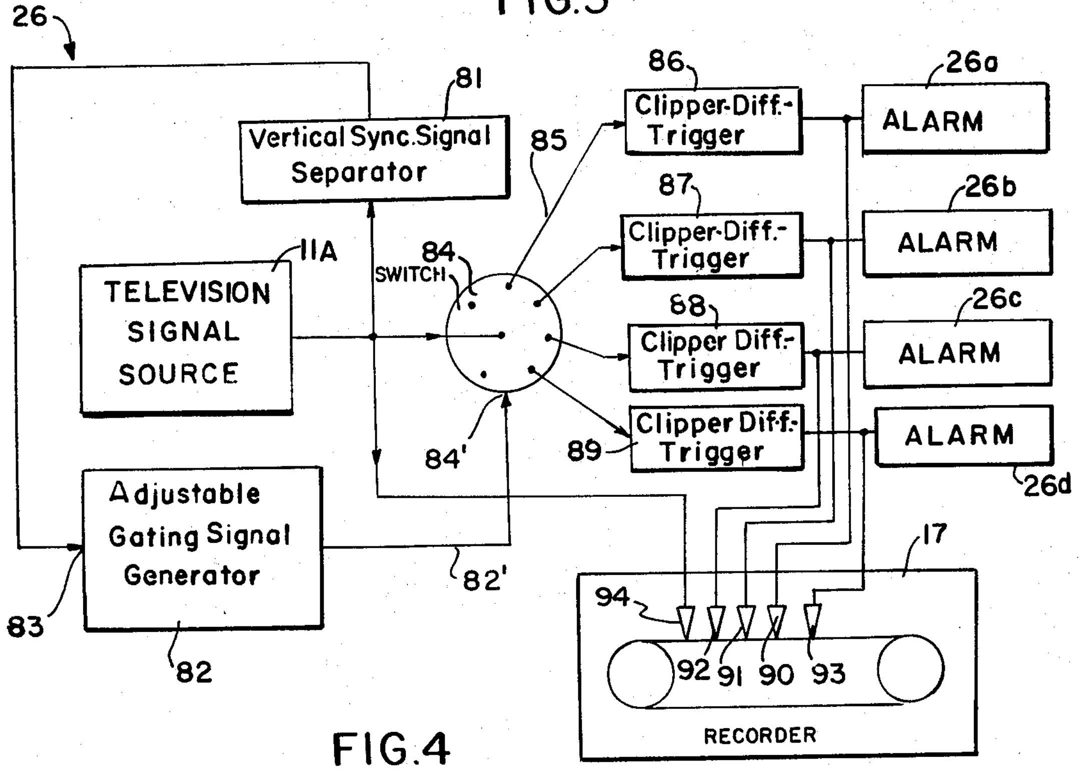
FIG. 4 is a schematic diagram of one form of signal analyzing apparatus applicable to the surveillance systems shown in FIGS. 1 and 3.

In FIG. 4 is shown one form of automatic alarm subsystem 26 which is operative to provide a visual and/or sonic alarm when a predetermined condition occurs in an environment such as to vary the signal derived by scanning said environment in a predetermined manner. FIG. 5 illustrates graphically a typical amplitude modulated video picture signal derived in television scanning an area of terrain such as sky and land and capable of being automatically analyzed by means of the apparatus of FIG. 4 for determining the presence of one or more intruders in the air and/or land areas scanned. Portion T–1 of the signal is generated in scanning the sky, which has a higher amplitude and is brighter in contrast to a portion T–3 of the signal generated in scanning terrain in the field of the camera. A portion T–4 contains spikes in the signal generated in scanning a nearby bright object. Portions of the signal which cause inflections in amplitude are generated in scanning objects such as aircraft in the sky, missiles or other objects contrasted against the surrounding terrain.

Thus by separately analyzing the separate sections T–1, T–2, T–3, T–4, etc. of the video picture signal generated in scanning the area under surveillance to determine if such portion thereof varies in respective amplitudes beyond certain predetermined degrees an indication may be had of the presence of an object or intruder in the scanning field.

Automatic signal analysis is effected in the apparatus of FIG. 4 by gating portions T–1, T–2, T–3, T–4, etc. of the video picture signal each time it is generated by the television camera or each time it is reproduced from the video tape recorder, to separate clipper differentiator trigger circuits denoted 86–69 by means of a distributor switch 84 provided in the output of the television signal source 11A. The distributor 84 comprises a switching network or device such as a magnetron beam switching tube having its outputs 85 connected to respective of the plurality of clipper differentiator trigger circuits 86–89. Each of the clipper-differentiator trigger circuits 86–89, contains a clipping circuit, a differentiating circuit and a trigger circuit which are operative to clip any portion of the signal portion fed thereto, which portion is above or below a predetermined value and to feed said clipped portion to activate a trigger device such as a Schmidt cathode-coupled multivibrator which is triggered in response to the clipped signal to generate a pulse which is fed to activate the alarm circuit **26*a*. The same trigger circuit signals are fed to a recording head 90 which records the signal clipped on a selected portion of the tape of the tape recorder 17 of FIGS. 1 and 2 or computer 52 of FIG. 3. The clipper-differentiator-inverter circuits 86–89 are each adjusted to clip and pass to their output circuits only those portions of the respective analog signals fed to each which are representative of a change in radiation or radiation pattern in the field being scanned such as that caused by radiation of an object in the sky or on the ground or water. The clipper-differentiator devices 86–89** may each be fixed in clipping level or adjustable to respond to particular radiation levels for durations which may develop beyond that normally present in each portion of the picture signal being analyzed.

The electronic distributor or gate 84 has a switching input 84′ extending from a gating signal generator 82. The generator 82 is adjustable or variable and may comprise a delay line network, magnetic recorder or other means operative to generate gating signals generated in accordance with the characteristics of the particular area being scanned once a trigger input 83 to said generator is energized. Energization of the trigger input 83 may either be effected by clipping the frame vertical signal from the television signal source and applying same to the initiating or trigger input 83 of the gating signal generator or by means of the signals generated by the controller or computing means 15 and 61 of FIGS. 1 and 3. In other words, two modes of operation are herein proposed, one in which the television signal source 11A is a television camera with a free running deflection control sync signal circuit where in the vertical frame sync signals are clipped in a vertical sync signal separator 81 and the clipped signal is applied as a pulse to the trigger input 83 to initiate generation of the gating signals in synchromization with the television picture signal and the other wherein a computer or controller, as described, generates an initiating signal which is simultaneously fed to trigger both the signal generator and the sync signal deflection chains of the television camera so tjat the gating signals and the video picture signal with be simultaneously generated in synchronization with each other.

In still another mode of operation of the apparatus of FIG. 5, the controller of the scanning and analyzing means of FIG. 4 may comprise the signal generator 82 which may be operated by timing means or the described controllers for all cameras and thereafter generate both gating signals and a trigger signal for initiating a full frame scan of the image field by the television camera. In this latter model of operation, the signal generator 82 may comprise a magnetic disc or drum which repeatedly reproduces both trigger and gating signals.

The gating signal generator 82 may also comprise a network of delay lines operative to generate precisely times pulse signals on its output 82 ' in response to an initiating pulse fed to its input 83 either from sync separator 81 or the described master controllers 15 and 61.

Each of the clipper-differentiator-inverter circuits 86–89 is connected to a respective alarm device, denoted *26a–26d* and a respective magnetic recording head, denoted 90–93 for recording the signals on respective tracks of a magnetic disc, drum or endless loop magnetic tape forming part of a magnetic recorder 17. The recorded signals may be stored for future reference and immediately reproduced therefrom and applied to retain an image of the phenomenon on a cathode ray tube or radar screen or other type of display means. A fifth recording head 94 is shown operatively connected to the output of the television signal source for recording the picture signal generated in scanning the image field and may be reproduced therefrom to generate an image on a viewing screen wherein the reproduced recordings of the clipped signals may be applied to the monitor screen to generate a reference image of the location of the intruder which may be of greater intensity than the image thereof which is generated on the viewing screen from the video picture signal. An indication of the location of the intruder is also provided to the person monitoring the surveillance operation by noting which of the alarm devices becomes energized.

Figure 6:
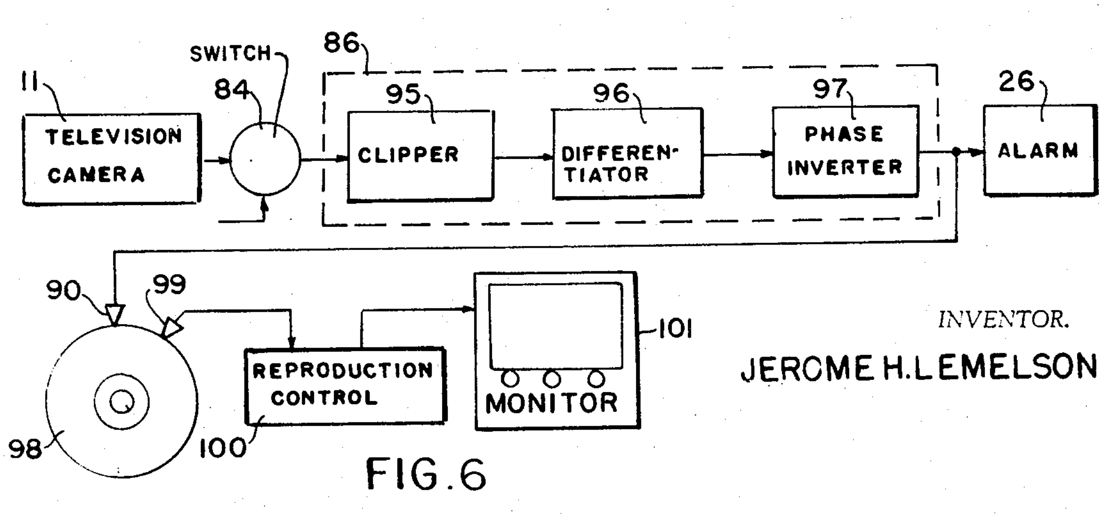
FIG. 6 shows further details of the automatic analysis circuitry of FIG. 4.

FIG. 6 illustrates further details of a typical clipper-differentiator- inverter circuit such as circuit 86 of FIG. 4. The output of television signal source, camera 11, is passed through gate 84 to a clipper 95 which preferably also contains suitable signal amplifying means and is adjusted to the desired clipping level. Pulses from the clipper circuit 95 are fed to a differentiator circuit 96 the output of which is connected to a phase inverter 97 to provide positive pulses of proper shape and duration which may be further amplified in the inverter. The output of the inverter 97 extends to the alarm device 26 which may comprise the switching inout of a flip-flop controlling operation of a particular lamp or indicator. The putput of the circuit 86 defined by the clipper, differentiator and phase inverter, also extends to recording head 90 which is shown operative to record the signal on a magnetic recording drum or disc. The recorded signal may be reproduced by a magnetic pick-up 99, passed to a reproduction controller 100 which may be a manual selection unit operative to apply said signal, upon demand, to the viewing screen of a video monitor 101 to generate an image indicative of the location of the intruder in the image field. The input to the video monitor is also connected to receive suitable television signals generated by the camera 11 in synchronization with the clipped signal or signals so that the intruder may be properly located or tracked. The recordings of the outputs of devices 86–89 may be retained on the recording surface of the recorder 98 as new output signals are generated and the reproductions of said recordings may be applied to the monitor so that a trace of the movement of the intruder is provided on the monitor screen as all signal recordings are reproduced and applied to modulate the write beam of the monitor.

Means other than heretofore described and illustrated in the drawings may also be utilized to indicate, not only the presence of an intruder in the filed being scanned but also the location of such an intruder in code reference form. Timing means may be employed, initiated by the clipped frame vertical sync signal or a signal generated as a reference signal by the signal generator 82 for indicating the location of the intruder in the scanning field in digital form. The binary digital signals generated during the interval between the initiating of scanning and the instant an intruder is indicated may be applied to a computer for automatic analysis and determination of the coordinates of the intruder's location in the field being scanned. Radar may be employed to determine the range of the intruder and it may be initiated and directed by the signals generated on outputs of devices 86–89.

I claim:

1. Scanning apparatus for monitoring changing events comprising:

first means for scanning an image field which changes in content with time, said first means including a video scanner having a read beam, and deflection control means for said read beam, second means for controlling said deflection control means for causing said read beam of said video scanner to full frame scan its scanning field, trigger input means for initiating operation of said second means to cause said beam to full frame scan the field presented to said video scanner in a single scanning cycle and to effect the generation of a single full-frame composite video picture signal and the output of said video scanner each time said trigger input means is activated, a monitor station located remote from said first means and having a video receiver including a monitor screen and means for generating image representations on said screen of the image phenomena scanned by said first means, means for establishing a communication link between the output of said video scanner and said monitor station, means for generating scanning control signals and transmitting same to energize said trigger input means to initiate a scanning cycle, and means for retaining the image generated by said single full frame composite video picture signal on the screen of said monitor station video receiver for an extended period of time whereby the image phenomenon may be visually monitored.

2. Scanning apparatus in accordance with claim 1, whereby said means retaining the image on the screen of said monitor station video receiver comprises a recorder for video picture signals received from said video scanner.

3. Scanning apparatus in accordance with claim 2, whereby said recorder is operative to receive and record all of the video picture signals generated by said video scanner and means for selectively reproducing video picture signals from said recorder and transmitting said signals to said video receiver to generate different still images on its screen.

4. Scanning apparatus in accordance with claim 2, including means for analyzing the video picture signals generated by said video scanner and detection means for generating alarm signals when detectable changes occur in the characteristics of said video signals which changes are indicative of distinct changes in the content of the phenomenon of the field scanned, and means at said monitor station responsive to said alarm signals for indicating the occurrence of a discrete change in the image field being scanned.

5. Scanning apparatus in accordance with claim 4, whereby said means responsive to said alarm signals includes means for effecting the reproduction of those video picture signals which have been recorded by said recorder and containing said changes in said signals.

6. Scanning apparatus in accordance with claim 4, including means for causing said video scanning means to sequentially scan different image fields, and means operative in response to the generation of an alarm signal for controlling said scanning means to repeatedly scan an image field in which a detectable change occurs which causes the generation of said alarm signal whereby the changing events occurring in said image field may be monitored over an extended time interval.

7. Apparatus in accordance with claim 6, said scanning means including a television camera, means for rotatably supporting said television camera, means for power rotating said camera, means for controlling rotation of said camera to position it to scan different selected image fields, and means responsive to the generation of said alarm signal for retaining said camera so located on its support as to permit it to repeatedly scan the image field in which said distinct change occurs whereby said change may be monitored at said monitor station as it develops.

8. Apparatus in accordance with claim 7, including a plurality of television cameras defining said monitor means, and a plurality of communication channels extending from said cameras to said monitor station, multiplexing means for sequentially connecting the output of each camera with the input to said monitor station and means for controlling said multiplexing means and the scanning means of each camera whereby a scanning cycle for each camera is initiated after the camera output is operatively connected to said monitor station and the multiplexing means is activated to connect the next camera with the input to the monitor station after the completion of a scanning cycle by the previous camera activated in sequence therewith.

9. Apparatus in accordance with claim 8, whereby said recorder is a magnetic recorder having a video pick-up head for reproducing single frame video picture signals recorded as received from said television cameras, the input to said video receiver of said monitor station being operatively connectable to said video pick-up head to permit the reproduction and monitoring of video signals recorded by said recorder.

* * * * *